(12) United States Patent
Kumar et al.

(10) Patent No.: US 11,021,570 B2
(45) Date of Patent: Jun. 1, 2021

(54) PROCESS FOR THE PRODUCTION OF THERMOPLASTIC POLYESTER

(71) Applicant: SABIC GLOBAL TECHNOLOGIES B.V., Bergen op Zoom (NL)

(72) Inventors: Prashant Kumar, Evansville, IN (US); Husnu Alp Alidedeoglu, Newburgh, IN (US); Keshavaraja Alive, Mount Vernon, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 26 days.

(21) Appl. No.: 16/474,616

(22) PCT Filed: Dec. 6, 2017

(86) PCT No.: PCT/EP2017/081632
§ 371 (c)(1),
(2) Date: Jun. 28, 2019

(87) PCT Pub. No.: WO2018/121962
PCT Pub. Date: Jul. 5, 2018

(65) Prior Publication Data
US 2019/0338071 A1    Nov. 7, 2019

(30) Foreign Application Priority Data
Dec. 28, 2016    (EP) .................................... 16207082

(51) Int. Cl.
*C08G 63/181*    (2006.01)
*B01J 21/06*    (2006.01)
*C08G 63/82*    (2006.01)

(52) U.S. Cl.
CPC .......... *C08G 63/181* (2013.01); *B01J 21/063* (2013.01); *C08G 63/82* (2013.01)

(58) Field of Classification Search
USPC .......................... 528/271, 272, 274; 502/150
See application file for complete search history.

(56) References Cited

U.S. PATENT DOCUMENTS

| 3,842,041 A | 10/1974 | Browne et al. |
| 2003/0104203 A1 | 6/2003 | Tam et al. |

FOREIGN PATENT DOCUMENTS

| EP | 1281725 A1 | 2/2003 |
| EP | 2085417 | 8/2009 |
| JP | 35093937 A | 7/1975 |

OTHER PUBLICATIONS

International Search Report for the corresponding PCT/EP2017/081632; International Filing Date: Dec. 6, 2017; dated Mar. 13, 2018; 14 pages.

*Primary Examiner* — Terressa Boykin
(74) *Attorney, Agent, or Firm* — Cantor Colburn LLP

(57) ABSTRACT

The present invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm. Such process results in a reduction of the polymerisation time. Furthermore, it allows for the production of thermoplastic polyesters having a desired balance of intrinsic viscosity and carboxylic end group content at a reduced polymerisation time.

16 Claims, No Drawings

PROCESS FOR THE PRODUCTION OF THERMOPLASTIC POLYESTER

CROSS-REFERENCE TO RELATED APPLICATIONS

This application is a National Stage application of PCT/EP2017/081632, filed Dec. 6, 2017, which claims the benefit of European Application No. 16207082.5, filed Dec. 28, 2016, both of which are incorporated by reference herein in their entirety.

The present invention relates to a process for the production of thermoplastic polyester. In particular, the invention relates to a process for the production of thermoplastic polyester using dicarboxylic acids. In particular, the invention relates to a process for the production of thermoplastic polyester where the thermoplastic polyester is a poly(butylene terephthalate) wherein the thermoplastic is produced using terephthalic acid as monomer. In particular, the invention aims at reduction of the polymerisation time. Furthermore, it allows for the production of thermoplastic polyesters having a desired balance of intrinsic viscosity and carboxylic end group content at a reduced polymerisation time.

Thermoplastic polyesters are polymeric products that have found their application in a vast range of products. Particular species of thermoplastic polyesters, including for example poly(ethylene terephthalate), poly(trimethylene terephthalate) and poly(butylene terephthalate), have multiple desirable properties rendering them particularly useful for the production of many articles, including but not limiting to good dimensional stability in injection moulding, good heat resistance, and good wear resistance. Further examples of thermoplastic polyesters that have found widespread application include polyether ester block copolymer elastomers.

The production of such thermoplastic polyesters commonly takes place via a polycondensation process. In such polycondensation process, the reaction mixture may comprise a dihydroxy alkane and a dicarboxylic acid. In particular, thermoplastic polyesters may be produced using a reaction mixture comprising a dihydroxy alkane and an aromatic dicarboxylic acid. Such thermoplastic polyesters may have a balance of mechanical properties, thermal properties and processing properties that render them particularly suitable for a wide variety of applications, including the production of moulded objected by e.g. injection moulding, the production of fibres for e.g. textile applications, and the production of hollow shapes by blow moulding.

Suitable dicarboxylic acids that are used in the production of such thermoplastic polyesters commonly have a relatively high melt temperature, such as a melt temperature of above 200° C. Because of this, such dicarboxylic acid are commonly introduced into the process for production of such thermoplastic polyesters in a powdery solid form.

A particular dicarboxylic acid that is used in the production of a variety of commercially attractive thermoplastic polyesters is terephthalic acid. Terephthalic acid is produced as commodity chemical on global scale and widely used in the production of thermoplastic polyesters.

In the commercial production of thermoplastic polyesters, a particular relevant aspect of the process is the polymerisation time. In order to increase the utilisation of a polymerisation plant, it is desired to be able to produce the thermoplastic polyesters in a time that is as short as possible. Such reduction of polymerisation time has benefits in both a reduction of utilities consumed per quantity of product produced, as well as in the total production capacity of a polymerisation plant in a given time. For example, a reduction of the polymerisation time may increase the annual production capacity of a plant, and thus the production efficiency. The increase of production efficiency is an important driver in the manufacturing process of thermoplastic polyesters on commercial scale. Therefore, there is an ongoing desire to reduce the polymerisation time of thermoplastics polyesters.

This is provided by the process according to the present invention. The present invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm.

Such process results in a reduction of the polymerisation time. Furthermore, it allows for the production of thermoplastic polyesters having a desired balance of intrinsic viscosity and carboxylic end group content at a reduced polymerisation time.

Further particularly, it is preferred in the process according to the present invention that the average particle size of the dicarboxylic acid particles is ≥110 μm, more preferably ≥120 μm, even more preferably ≥130 μm, even further preferably ≥140 μm.

It is further preferred that the dicarboxylic acid particles have an average particle size of 300 μm, more preferably ≤250 μm, even more preferably ≤200 μm.

In particular, it is preferred that the dicarboxylic acid particles have an average particle size of ≥100 μm and ≤300 μm, more preferably ≥100 μm and ≤250 μm, even more preferably ≥100 μm and ≤200 μm, such as ≥110 μm and ≤200 μm, or ≥120 μm and ≤200 μm, or ≥130 μm and ≤200 μm, or ≥140 μm and ≤200 μm.

The use of dicarboxylic acid particles having such average particle diameter is further beneficial in that the dicarboxylic may be conveyed to the process for the production of a thermoplastic polyester quicker and more reliable. In particular where the dicarboxylic acid particles are conveyed to the process via tubing systems, either as powder or in a slurry, the use of such dicarboxylic acid particles results in a reduction of likelihood of material build-up and/or blocking of the conveying system.

The particle size of the dicarboxylic acid particles may be determined as the D50 particle size in accordance with ISO 9276-2:2014.

The melting temperature of the dicarboxylic acid may for example be determined in accordance with ASTM E324 (2016).

The invention in one of its embodiments also relates to a process according comprising the following steps in this order:
 a. introducing a quantity of the dicarboxylic acid particles into a reactor vessel;
 b. introducing a quantity of a dihydroxyalkane into the reaction vessel; and
 c. introducing a quantity of a catalyst for the production of polyester into the reaction vessel.

Preferably, the invention in one of its embodiments also relates to a process according comprising the following steps in this order:
 a. introducing a quantity of the dicarboxylic acid particles into a reactor vessel;
 b. introducing a quantity of a dihydroxyalkane being 1,4-butanediol into the reaction vessel; and
 c. introducing a quantity of a catalyst for the production of polyester into the reaction vessel.

The reaction mixture that is used in the process according to the present invention may comprise a dihydroxyalkane. The dihydroxyalkane may be an α,ω-dihydroxyalkane. The dihydroxyalkane may for example comprise 2-10 carbon atoms. The dihydroxyalkane may be a linear dihydroxyalkane. The dihydroxyalkane that may be used in the process according to the present invention may for example be one or more selected from ethylene glycol, 1,3-propanediol, 1,2-propanediol, 1,4-butanediol, 1,2-butanediol, 2,3-butanediol, hexylene glycol, isosorbide, tetramethyl cyclobutanediol, cyclohexanedimethanol, or combinations thereof. Preferably, the dihydroxyalkane is selected from ethylene glycol, 1,3-propanediol, 1,4-butanediol, or combinations thereof. Even more preferably, the dihydroxyalkane is ethylene glycol or 1,4-butanediol.

The thermoplastic polyester may be a homopolymer or a copolymer. In the case where the thermoplastic polyester is a homopolymer, the dihydroxyalkane that is used in the process according to the present invention is selected from ethylene glycol, 1,3-propanediol or 1,4-butanediol. In the case where the thermoplastic polyester is a copolymer, the dihydroxyalkane is selected from ethylene glycol, 1,3-propanediol, 1,4-butanediol, or combinations thereof.

Preferably, the dihydroxyalkane is 1,4-butanediol.

The dicarboxylic acid having a melting temperature of ≥200° C. that is used in the process according to the present invention may for example be selected from isophthalic acid, terephthalic acid, furandicarboxylic acid, naphthalenedicarboxylic acid, or combinations thereof. The dicarboxylic acid having a melting temperature of ≥200° C. may for example be terephthalic acid. The dicarboxylic acid having a melting temperature of ≥200° C. may for example be furandicarboxylic acid.

It is preferred that the dicarboxylic acid having a melting temperature of ≥200° C. comprises a cyclic moiety.

In an embodiment of the invention, the reaction mixture comprises ≥95.0 wt %, preferably ≥98.0 wt %, of terephthalic acid or furandicarboxylic acid or combinations thereof, with regard to the total weight of dicarboxylic acid present in the reaction mixture. In another embodiment, the dicarboxylic acid present in the reaction mixture consists of terephthalic acid or furandicarboxylic acid or a combination thereof. In a particular embodiment, the dicarboxylic acid present in the reaction mixture consists of terephthalic acid.

In certain further embodiments of the invention, the reaction mixture may further comprise an aliphatic dicarboxylic acid. For example, the aliphatic dicarboxylic acid may be a dicarboxylic acid comprising 2-10 carbon atoms. For example, the aliphatic dicarboxylic acid may be selected form succinic acid, adipic acid, suberic acid, sebacic acid, or combinations thereof. For example, the aliphatic dicarboxylic acid may be adipic acid.

The reaction mixture may for example comprises ≤50.0 wt %, preferably ≤30.0 wt %, more preferably ≤20.0 wt %, even more preferably ≤10.0 wt % of an aliphatic dicarboxylic acid selected form succinic acid, adipic acid, suberic acid, sebacic acid, or combinations thereof, with regard to the total weight of the dicarboxylic acid. For example, the reaction mixture may for example comprises ≤50.0 wt %, preferably ≤30.0 wt %, more preferably ≤20.0 wt %, even more preferably ≤10.0 wt % of adipic acid, with regard to the total weight of the dicarboxylic acid.

It is preferred that the thermoplastic polyester comprises ≥95.0 wt % of polymeric units derived from terephthalic and a dihydroxyalkane. More preferably, the thermoplastic polyester comprises ≥98.0 wt % of polymeric units derived from terephthalic and a dihydroxyalkane.

It is preferred that the reaction mixture comprises ≥95.0 wt % of terephthalic acid with regard to the total weight of the dicarboxylic acids, and ≥95.0 wt % of 1,4-butanediol with regard to the total weight of the dihydroxyalkanes. Alternatively, the reaction mixture may comprise ≥95.0 wt % of terephthalic acid with regard to the total weight of the dicarboxylic acids, and only 1,4-butanediol as dihydroxyalkane.

The processes for the production of thermoplastic polyesters according to the present invention may for example be a process comprising the steps of:
(a) reacting a reaction mixture comprising a dicarboxylic acid and a dihydroxyalkane in an esterification reactor to produce a first polyester oligomer.
(b) subjecting the first polyester oligomer obtained from (a) to a first polycondensation in one or more reactors such as one or more continuously stirred tank reactors to obtain a second polyester oligomer; and
(c) subjecting the second polyester oligomer obtained from (b) to a further polycondensation in a low-pressure reactor to obtain the thermoplastic polyester.

In the context of the present invention, the pressure in the low-pressure reactor may for example be ≥0.05 and ≤5.0 mbar.

The polyester oligomer may for example be a poly(butylene terephthalate) oligomer. Alternatively, the polyester oligomer may be a poly(ethylene terephthalate) oligomer. Alternatively, the polyester oligomer may be a poly(trimethylene terephthalate) oligomer.

The poly(butylene terephthalate) oligomer may for example be obtained from a reaction of a reaction mixture comprising terephthalic acid and 1,4-butanediol. Optionally, the reaction mixture may comprise one or more further dicarboxylic acids. Suitable further dicarboxylic acids may for example be selected from aromatic dicarboxylic acids such as isophthalic acid and naphthalene dicarboxylic acid. Alternatively, suitable further dicarboxylic acids may for example be selected from aliphatic dicarboxylic acids such as 1,2-cyclohexane dicarboxylic acid, 1,4-cyclohexane dicarboxylic acid, 1,4-butane dicarboxylic acid, 1,6-hexane dicarboxylic acid, 1,8-octane dicarboxylic acid, and 1,10-decane dicarboxylic acid. The reaction product may also comprise one or more further dihydroxyalkane, such as ethanediol and propanediol.

For example, the reaction mixture may comprise only terephthalic acid as dicarboxylic acid, and only 1,4-butanediol as dihydroxyalkane. In such case, the poly(butylene terephthalate) obtained from the process is a homo-poly(butylene terephthalate). In other embodiments, the reaction mixture may comprise ≥90.0 wt %, alternatively ≥95.0 wt %, alternatively ≥98.0 wt %, of terephthalic acid, with regard to the total weight of the dicarboxylic acids. In further embodiments, the reaction mixture may comprise ≥90.0 wt %, alternatively ≥95.0 wt %, alternatively ≥98.0 wt %, of 1-4-butanediol with regard to the total weight of the dihydroxyalkanes.

It is preferred that the poly(butylene terephthalate) oligomer comprises in the chain of the polymer ≥90.0 wt % with regard to the total weight of the poly(butylene terephthalate) oligomer of units derived from terephthalic acid and/or 1,4-butanediol, preferably ≥95.0 wt %, more preferably ≥98.0 wt %.

The poly(butylene terephthalate) oligomer preferably comprises in the chain of the polymer ≥90.0 wt %, preferably ≥95.0 wt %, more preferably ≥98.0 wt %, with regard to the total weight of the poly(butylene terephthalate) oligomer of units according to formula (I) and/or formula (II):

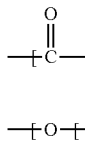

Formula (I)

Formula (II)

The poly(butylene terephthalate) oligomer that is used to prepare the PBT resin may for example have an intrinsic viscosity (IV) of between 0.10 and 0.13 dl/g and CEG of between 80 mmol/kg and 110 mmol/kg. The intrinsic viscosity may for example be determined in accordance with ASTM D2857-95 (2007).

The poly(butylene terephthalate) oligomer may be prepared by reacting terephthalic acid with 1,4-butanediol (BDO) in the presence of a catalyst. Various grades of terephthalic acid may be used, but purified terephthalic acid (PTA) is preferred. Purified PTA is commercially available from a number of vendors and typically contains 10 percent of less of impurities as measured using conventional techniques. Typically, 1,4-butanediol (BDO) and PTA are combined in a molar ratio of 6:1 to 2:1 in the presence of a catalyst such as of tetra(C1-C8 alkyl) titanate such as tetraisopropyl titanate (TPT). To achieve an IV of between 0.10 and 0.13 dl/g and CEG of between 80 mmol/kg and 110 mmol/kg, a BDO to PTA ratio of 2:1 is employed. To achieve an IV of approximately 0.13-0.17 dl/g and a CEG of between 90 and 180 mmol/kg, a BDO to PTA ratio of 3:1 is employed. Alternatively, to achieve an IV of 0.25-0.43 dl/g and a CEG of lower than 20 mmol/kg, a BDO to PTA ratio of 4:1 is employed. The molar ratio of BDO to PTA will vary depending on the desired IV and CEG of the resulting PBT oligomer.

In one embodiment, 0.1 to 300 ppm tetra(C1-C8 alkyl) titanate catalyst is used. In one embodiment, 0.1 to 100 ppm tetra(C1-C8 alkyl) titanate catalyst is used.

In one embodiment, 0.1 to 200 ppm TPT catalyst is used. In one embodiment, 0.1 to 100 ppm TPT catalyst is used.

To make the poly(butylene terephthalate) oligomer, the components BDO, PTA, and TPT are combined and heated to a temperature of approximately 160° C. to 180° C. When the temperature of the reaction mixture is in the range of approximately 160° C. to 180° C., the temperature is gradually raised to approximately 220° C. to 265° C. Ester interchange occurs at approximately 230° C. to 260° C., and is complete when the clearing point is reached based on visual inspection. As used herein the "clearing point" occurs when the reaction medium becomes homogeneous melt. After the clearing point is reached, the pressure is optionally adjusted to about 6.6 to 101 kPa and the temperature is maintained at about approximately 230° C. to 260° C. for sufficient time to achieve desired IV and CEG values in the resulting poly(butylene terephthalate) oligomer. At the completion of the reaction, the pressure is returned to atmospheric pressure and the polymer is analysed. The resulting poly(butylene terephthalate) oligomer, which contains the catalyst, can be cooled to a solid, then flaked, powdered, or pelletized, and is used to make poly(butylene terephthalate) resin.

In one embodiment, the poly(butylene terephthalate) oligomer contains 0.1 to 300 ppm tetra(C1-C8 alkyl) titanate catalyst. In one embodiment, the poly(butylene terephthalate) oligomer contains 0.1 to 100 ppm tetra(C1-C8 alkyl) titanate catalyst.

The process according to the present invention involves the production of poly(butylene terephthalate) starting from a poly(butylene terephthalate) oligomer by polycondensation in a low-pressure reactor. It is preferred that such low-pressure reactor is a continuous reactor, in which the poly(butylene terephthalate) oligomer is fed via at least one entry port, and in which the obtained poly(butylene terephthalate) is removed via at least one exit port. In such low-pressure reactor, the poly(butylene terephthalate) oligomer may for example be subjected to mixing to create a certain surface area for the polycondensation reactor to proceed to the desired extent. Such surface area may also be beneficial in ensuring adequate degassing. The volatiles removed by degassing may comprise an unreacted fraction of the material of the reaction mixture, as well as formed by-products. Such unreacted fraction of the material of the reaction mixture may for example comprise unreacted dihydroxyalkane, such as 1,4-butanediol.

Such formed by-products may for example comprise water and tetrahydrofuran (THF). The process in certain embodiments may include arrangements for separating the unreacted fraction of the material of the reaction mixture and the by-products, and feeding a certain portion of the unreacted fraction of the material of the reaction mixture back to the process for the production of the poly(butylene terephthalate) oligomer such as for example to an esterification process.

There are various ways to achieve the desired mixing in the low-pressure reactor. With progress of the polycondensation reaction, the viscosity of the poly(butylene terephthalate) in the low-pressure reactor increases. For that reason, the low-pressure reactor is preferably equipped with mixing means such as baffles. Such mixing baffles preferably provide a certain torque to mix the contents of the low-pressure reactor. The mixing baffles may be attached to one or more shafts to form an agitator. Preferably, the low-pressure reactor is a dual-shafts ring reactor.

An example of a suitable low-pressure reactor is described in US2008-0064834A1. The use of such low-pressure reactor in the process according to the present invention may contribute to a uniform and predictable material quality of the poly(butylene terephthalate) obtained from the process.

In a particularly desired embodiment, the present invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm;

wherein the dicarboxylic acid having a melting temperature of ≥200° C. that is used in the process according to the present invention is selected from isophthalic acid, terephthalic acid, furandicarboxylic acid, naphthalenedicarboxylic acid, or combinations thereof;

wherein the reaction mixture comprises ≥95.0 wt %, preferably ≥98.0 wt %, isophthalic acid, terephthalic acid, furandicarboxylic acid, naphthalenedicarboxylic acid, or combinations thereof, with regard to the total weight of dicarboxylic acid present in the reaction mixture; and wherein the reaction mixture further comprises a dihydroxyalkane selected from ethylene glycol, 1,3-propanediol, 1,4-butanediol, or combinations thereof.

In a further particularly desired embodiment, the present invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm and ≤200 μm;

wherein the dicarboxylic acid having a melting temperature of ≥200° C. that is used in the process according to the present invention is selected from isophthalic acid, terephthalic acid, furandicarboxylic acid, naphthalenedicarboxylic acid, or combinations thereof;

wherein the reaction mixture comprises ≥95.0 wt %, preferably ≥98.0 wt %, isophthalic acid, terephthalic acid, furandicarboxylic acid, naphthalenedicarboxylic acid, or combinations thereof, with regard to the total weight of dicarboxylic acid present in the reaction mixture; and wherein the reaction mixture further comprises a dihydroxyalkane selected from ethylene glycol, 1,3-propanediol, 1,4-butanediol, or combinations thereof.

It is also preferred that the present invention in an embodiment relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm and ≤200 μm;

wherein the dicarboxylic acid having a melting temperature of ≥200° C. that is used in the process according to the present invention is selected from isophthalic acid, terephthalic acid, furandicarboxylic acid, naphthalenedicarboxylic acid, or combinations thereof;

wherein the reaction mixture further comprises an aliphatic dicarboxylic acid selected form succinic acid, adipic acid, suberic acid, sebacic acid, or combinations thereof; and wherein the reaction mixture further comprises a dihydroxyalkane selected from ethylene glycol, 1,3-propanediol, 1,4-butanediol, or combinations thereof.

Further it is also preferred that the present invention in an embodiment relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm and ≤200 μm;

wherein the dicarboxylic acid having a melting temperature of ≥200° C. that is used in the process according to the present invention is selected from isophthalic acid, terephthalic acid, furandicarboxylic acid, naphthalenedicarboxylic acid, or combinations thereof;

wherein the reaction mixture further comprises ≤20 wt % with regard to the total weight of the dicarboxylic acid of an aliphatic dicarboxylic acid selected form succinic acid, adipic acid, suberic acid, sebacic acid, or combinations thereof; and wherein the reaction mixture further comprises a dihydroxyalkane selected from ethylene glycol, 1,3-propanediol, 1,4-butanediol, or combinations thereof.

In an even further particularly desired embodiment, the present invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm and ≤200 μm;

wherein the dicarboxylic acid having a melting temperature of ≥200° C. that is used in the process according to the present invention is selected from terephthalic acid, furandicarboxylic acid, or combinations thereof;

wherein the reaction mixture comprises ≥95.0 wt %, preferably ≥98.0 wt %, terephthalic acid, furandicarboxylic acid, or combinations thereof, with regard to the total weight of dicarboxylic acid present in the reaction mixture; and wherein the reaction mixture further comprises a dihydroxyalkane selected from ethylene glycol, 1,3-propanediol, 1,4-butanediol, or combinations thereof.

Most particularly, the invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm and ≤200 μm;

wherein the dicarboxylic acid having a melting temperature of ≥200° C. that is used in the process according to the present invention is terephthalic acid;

wherein the reaction mixture comprises ≥95.0 wt %, preferably ≥98.0 wt %, terephthalic acid, with regard to the total weight of dicarboxylic acid present in the reaction mixture; and wherein the reaction mixture further comprises a dihydroxyalkane selected from ethylene glycol, 1,3-propanediol, 1,4-butanediol, or combinations thereof.

Preferably the thermoplastic polyester comprises ≥95.0 wt % of polymeric units derived from terephthalic acid and a dihydroxyalkane being 1,4-butanediol.

Further most particularly, the invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm and ≤200 μm;

wherein the dicarboxylic acid having a melting temperature of ≥200° C. that is used in the process according to the present invention is terephthalic acid;

wherein the reaction mixture comprises ≥95.0 wt %, preferably ≥98.0 wt %, terephthalic acid, with regard to the total weight of dicarboxylic acid present in the reaction mixture; and wherein the reaction mixture further comprises a dihydroxyalkane wherein the dihydroxyalkane is 1,4-butanediol.

In the process according to the present invention, the reaction mixture may further comprise a dihydroxyalkane. It is preferred that the dihydroxyalkane is 1,4-butanediol.

Where a dihydroxyalkane is present in the reaction mixture, the molar ratio of the dihydroxyalkane to the dicarboxylic acid preferably is ≥1.0, more preferably ≥1.5, even more preferably ≥2.0, and even further preferably ≥2.0 and ≤4.0.

In a particular embodiment of the present invention, a quantity of a tetra(C1-C8) titanate is used as catalyst in the process. Particularly preferable, a quantity of 100-300 ppm of the catalyst is introduced into the reaction mixture. The catalyst preferably is tetraisopropyl titanate. In a preferred embodiment, the reaction mixture comprises 100-300 ppm of tetraisopropyl titanate as catalyst.

Further most particularly, the invention relates to a process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm and ≤200 μm;

wherein the dicarboxylic acid having a melting temperature of ≥200° C. that is used in the process according to the present invention is terephthalic acid;

wherein the reaction mixture comprises ≥95.0 wt %, preferably ≥98.0 wt %, terephthalic acid, with regard to the total weight of dicarboxylic acid present in the reaction mixture; and wherein the reaction mixture further comprises a dihydroxyalkane wherein the dihydroxyalkane is 1,4-butanediol;

wherein the reaction mixture further comprises 100-300 ppm of tetraisopropyl titanate as catalyst.

It is particularly preferred that the average particle diameter of the dicarboxylic acid particles is ≥120 μm and ≤150 μm.

The average particle diameter as used in the present invention may be understood to be determined in accordance with ASTM D1921-06 as the mean particle diameter.

The invention will now be illustrated by the following non-limiting examples.

Preparation of Thermoplastic Polyesters

In a 500 ml 3-necked round bottom flask, equipped with a condenser and a vacuum output, PBT polymers were prepared according to the process of the present invention. The flask was immersed in an oil bath which temperature was controlled by a Camile system.

A reaction mixture of 74.8 g of 1,4-butanediol and 121.7 g of terephthalic acid flakes were introduced into the flask, equipped with mechanical stirrer and torque reader. The oil temperature was set to 240° C. after 10 minutes, 180 ppm of catalyst with regard to the total weight of the 1,4-butanediol and the terephthalic acid was assed to the flask. The catalyst was tetraisopropyl titanate. The temperature of the reaction mixture was maintained at 240° C. while stirring at 260 rpm under nitrogen atmosphere. An esterification reaction of the 1,4-butanediol and the terephthalic acid was performed at atmospheric pressure. When the reaction mixture reached its clearing point, i.e. the point where visual observation showed the reaction mixture to become a transparent liquid, the residence time was recorded. This marked the completion of the esterification stage of the polymerisation reaction.

The polymerisation reaction was initiated by reduction of the pressure in the flask to 0.2 mbar. The increase in torque at given speed of the mechanical stirrer was observed. The time needed to reach a particular torque level at given speed was determined. The increase in torque is an indicator for the polymer chain build-up that occurs during the polymerisation reaction. The higher the torque, the higher the degree of polymerisation that is reached. The faster a particular torque level is reached, the faster the polymerisation reaction is performed.

The polymerisation was performed stepwise: first, the stirrer was set to 260 rpm. When a torque level of 3.40 N·m was reached, the residence time was registered and the stirrer speed decreased to 130 rpm. This reduced torque of the stirrer. When again after polymer build-up a torque of 3.40 N·m was reached, the residence time was registered and the stirrer speed further decreased to 65 rpm. Again when after further polymer build-up a torque of 3.40 N·m was reached, the residence time was registered and the stirrer speed further reduced to 32 rpm. Again when a torque of 3.40 N·m was reached, the residence time was registered. The obtained product was cooled to obtain poly(butylene terephthalate) polymer samples.

In the below table, the total residence time to reach a particular torque level at given stirrer speed is presented using different size terephthalic acid flakes.

TABLE I polymerisation times

| | Experiment | | |
|---|---|---|---|
| | 1 | 2 | 3 |
| TPA size | 74 μm | 120 μm | 141 μm |
| Esterification time | 35 | 33 | 28 |
| Time to 3.40@260 | 76 | 63 | 45 |
| Time to 3.40@130 | 94 | 70 | 48 |
| Time to 3.40@65 | 100 | 75 | 51 |
| Time to 3.40@32 | 107 | 81 | 56 |

In the above table, the TPA size is the average particle size of the terephthalic acid flakes introduced to the polymerisation reaction. The esterification time is the time between the addition of the catalyst to the reaction flask and the observance of the clearing point. The time to 30@260 is the time between the addition of the catalyst and the observance of a torque of 3.40 N·m at 260 rpm stirrer speed; equally, time to 3.40@130, 3.40@65 and 3.40@32 is the time between addition of the catalyst and the observance of a torque of 3.40 N·m at 130 rpm, 65 rpm and 32 rpm, respectively.

The poly(butylene terephthalate) polymer samples obtained from the reaction were subjected to material characterisations to determine the intrinsic viscosity and the carboxylic end group content.

The intrinsic viscosity was determined in accordance with ASTM D2857-95 (2007) using an automatic Viscotek Microlab 500 Relative Viscometer Y501. 0.200 g of a sample was dissolved in a 60/40 vol/vol % solution of phenol and 1,1,2,2-tetrachloroethane. Intrinsic viscosity was expressed in dl/g.

The carboxylic end group content of the samples was determined in accordance with ASTM D7409-15 using a Metrohm-Autotitrator Titrando 907, using a 800 Dosino 2 ml dosing unit and a 814 USB sample processor. All the units are controlled from a PC using Tiamo 2.0 Full version. 1.5-2.0 g of sample was fully dissolved in 50 ml of o-cresol at 80° C. After dissolving, the sample was cooled to room temperature and 50 ml of o-cresol and 1 ml of water were added. The blank was prepared along the same procedure. The electrodes and titrant dosing were dipped into the sample solution and the titration was started. The equivalence point of the titration was used for the calculation of the carboxylic end group value according to the equation:

$$CEG = (Q_S - Q_B) * N_{NaOH} * 1000$$

wherein:
CEG=the carboxylic end group content in mmol/kg;
$Q_S$=the titrated quantity of the sample in ml;
$Q_B$=the titrated quantity of the blank in ml; and
$N_{NaOH}$=the concentration of NaOH in mol/l.

The intrinsic viscosity (I.V.) and the carboxylic end group content (CEG) of the samples are presented in table II:

TABLE II material properties of sample poly(butylene terephthalates)

| | Experiment | | |
|---|---|---|---|
| | 1 | 2 | 3 |
| I.V. | 1.05 | 1.10 | 1.11 |
| CEG | 21 | 29 | 28 |

This demonstrates that the intrinsic viscosity and the carboxylic end group content of the sample polymers differ only marginally and all comply to the desired specifications of the poly(butylene terephthalate) products that are desired to be produced.

By comparing the results from the polymerisation time data in table 2, it is demonstrated that the process according to the present invention, in which terephthalic acid having an average particle size of ≥100 μm is used, results in a faster process whilst still, as demonstrated by the results in table 3, resulting in a desired product.

The invention claimed is:

1. Process for the production of a thermoplastic polyester using a reaction mixture comprising a dicarboxylic acid having a melting temperature of ≥200° C. wherein the dicarboxylic acid is introduced to the process in the form of particles having an average particle diameter of ≥100 μm; wherein the reaction mixture further comprising 1,4-butanediol.

2. Process according to claim 1 wherein the dicarboxylic acid particles have an average particle diameter of ≤200 μm.

3. Process according to claim 1 wherein a quantity of a tetra(C1-C8) titanate is used as catalyst.

4. Process according to claim 3 wherein the reaction mixture comprises 100-300 ppm of the catalyst.

5. Process according to claim 3, wherein the catalyst is tetraisopropyl titanate.

6. Process according to claim 1, wherein the dicarboxylic acid comprises a cyclic moiety.

7. Process according to claim 1 wherein the dicarboxylic acid is selected from isophthalic acid, terepthalic acid, furandicarboxylic acid, napthalenedicarboxylic acid, or combinations thereof.

8. Process according to claim 1 wherein the reaction mixture further comprises an aliphatic dicarboxylic acid selected from succinic acid, adipic acid, suberic acid, sebacic acid, or combinations thereof.

9. Process according to claim 1, wherein the reaction mixture comprises ≥95.0 wt % of a dicarboxylic acid selected from terephthalic, furandicarboxylic acid, or combinations thereof, with regard to the total weight of dicarboxylic acid present in the reaction mixture.

10. Process according to claim 1 wherein the thermoplastic polyester comprises ≥95.0 wt % of polymeric units derived from terephthalic acid and the 1,4-butanediol.

11. Process according to claim 1 comprising the following steps in this order:
  a. introducing a quantity of the dicarboxylic acid particles into a reactor vessel;
  b. introducing a quantity of the 1,4-butanediol into the reaction vessel; and
  c. introducing a quantity of a catalyst for the production of polyester into the reaction vessel.

12. Process according to claim 1 wherein the thermoplastic polyester is a poly(butylene terephthalate) comprising ≥95 wt % of units derived from terephthalic acid and 1,4-butanediol.

13. Process according to claim 1 wherein the dicarboxylic acid particles have an average particle diameter of ≥110 μm.

14. Process according to claim 1 wherein the dicarboxylic acid particles have an average particle diameter of 140 to 300 μm.

15. Process according to claim 1 wherein the 1,4-butanediol and thermoplastic polyester are combined in a molar ratio of 6:1 to 2:1.

16. Process for the production of a thermoplastic polyester using a reaction mixture; wherein the reaction mixture comprises
  terephthalic acid in the form of particles having an average particle diameter of 110 μm to 300 μm;
  1,4-butanediol; wherein a molar ratio of the 1,4-butanediol to the terephthalic acid is 6:1 to 2:1; and
  a catalyst comprising a tetra(C1-C8) titanate.

* * * * *